United States Patent Office 2,983,362
Patented May 9, 1961

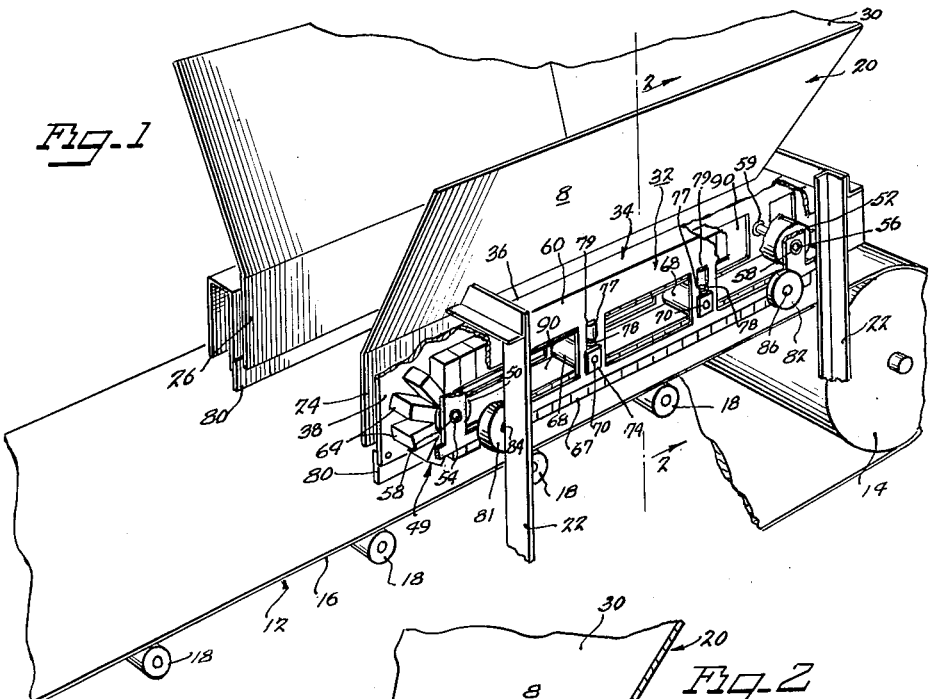

2,983,362
CONVEYOR MEANS
Liston H. Crist, Jr., 420 S. Stone Ave., La Grange, Ill.

Filed Jan. 19, 1959, Ser. No. 787,615

7 Claims. (Cl. 198—57)

The present invention relates to belt-type conveyor means, and more particularly to a conveyor which is provided with means for preventing material being conveyed from spilling over the sides of the conveyor.

Ordinarily, materials such as sand, gravel, coal, grain, sugar, salt, etc., are conveyed by means of conveyor belts which are troughed to prevent the materials being conveyed from spilling over the longitudinal edges thereof. However, in certain sections of the conveyor belt troughing may be either impractical, or else the quantity of material is so abundant that even if the conveyor belt is troughed, the material will spill over the edges. Difficulty is particularly experienced at the loading end of the conveyor belt where a fairly large quantity of material may be initially dropped or transferred to the conveyor belt from a suitable source of supply or hopper mechanism.

When hoppers have been used to direct the material onto the conveyor belt, the lower edges of the walls of the hoppers have been spaced above the conveyor belt to prevent excessive wear on the conveyor belt. To prevent the material from spilling out from beneath the walls, a rubber strip has been attached to the lower edge of each of the walls, the rubber strip extending down into contact with the conveyor belt. Since these rubber strips continually ride on the conveyor belt, in time the conveyor belt has become worn and has needed replacement. This is especially true when the material being conveyed is grit, for in such a case, the grit gathers under the strips and increases the wear on the conveyor belt.

Accordingly, it is an object of the present invention to provide a conveyor means which is provided with means for retaining material being conveyed on the surface of a conveyor belt. Another object of the present invention is the provision of conveyor means including a hopper which is adapted to retain the material being conveyed on the surface of a conveyor belt without causing undue wear on the conveyor belt. A further object is the provision of conveyor means including a device for preventing material from spilling over the sides of a conveyor belt, the device being readily adaptable to existing installations. Still a further object is the provision of a device of the class described hereinafter which is durable in use and inexpensive to manufacture.

Other objects and advantages of the present invention will become apparent by reference to the following description and accompanying drawings:

In the drawings:

Figure 1 is a fragmentary perspective view showing a conveyor means embodying various features of the present invention, portions being broken away to show the internal construction of the retaining device;

Figure 2 is an enlarged fragmentary sectional view taken generally along line 2—2 of Figure 1;

Figure 3 is a fragmentary sectional view taken generally along line 3—3 of Figure 2;

Figure 4 is an enlarged fragmentary sectional view taken generally along line 4—4 of Figure 2; and Figure 5 is an enlarged fragmentary front view of a portion of the hopper shown in Figure 1 illustrating another embodiment of the mounting arrangement for the retaining device.

In general, a conveyor means constructed in accordance with the invention is utilized to prevent material being conveyed from spilling over the sides of a conveyor belt. The means comprises at least one endless belt which extends along a side edge of at least a portion of the conveyor belt with the lower edge thereof being in frictional engagement with the copper surface of the conveyor belt. The endless belt is provided with sufficient thickness to prevent material being conveyed from spilling over the sides of the conveyor belt and is movable with the conveyor belt to thereby reduce wear thereon.

For purposes of explanation, the invention described and illustrated is a belt-type conveyor means which includes a deliver hopper, which is indicated in the drawings by the reference numeral 8, and is adapted to feed material, such as grit, sand, grain, salt, etc. to a conveyor belt 12. The conveyor belt 12 in the illustrated embodiment is of the endless type and is constructed according to any of the suitable methods and materials now employed in conveyor belt manufacture. Since the construction of the conveyor belt 12 is not an important feature of the present invention, it will not be described in detail. In the illustrated embodiment the rearward end (i.e., towards the right as shown in Figure 1) of the conveyor belt 12 is passed over a roller 14; and the intermediate portions of the generally horizontally extending upper run 16 of the conveyor belt 12 are adapted to be supported by a plurality of other rollers 18. The conveyor belt 12 is driven by suitable means (not shown).

In the illustrated embodiment, the hopper 8 includes a chute 20 which is supported above the conveyor belt 12 by a suitable frame 22, and includes a pair of spaced apart, longitudinally extending, vertically disposed side walls 24 and 26 and a vertically disposed rear wall 30 interconnecting the rearward edges of the side walls 24 and 26. The particular construction of the chute 20 is not an important feature of this invention, and hence, it may be of any desired shape. In the chute 20 illustrated, to further guide the material to be conveyed onto the conveyor belt 12, the upper portions of the side walls 24 and 26 are diverged outwardly. The chute 20 may be constructed of a material such as wood, steel, etc., which is able to withstand the type of service that a chute for a conveyor belt is subjected to.

A retaining means 32 is connected to each of the side walls 24 and 26 to prevent the material within the chute 20 from spilling out from beneath the side walls 24 and 26. Since both of the retaining means 32 are similarly constructed, for purposes of explanation, only one of the retaining means 32 is explained hereinafter. As illustrated, the retaining means 32 includes a longitudinally extending channel-shaped housing 34 which is carried by the associated side wall 24 for vertical movement relative thereto, the housing 34 being disposed with its web or interconnecting wall 36 uppermost. The housing 34 may be constructed of a structural material such as metal, wood, etc.

As shown in Figures 2 and 3, the inner leg or wall 38 of the housing 34 is slidably connected to the associated side wall 24 of the chute 20 by means of a plurality of spaced apart T-shaped projections 40 which extend inwardly from the inner wall 38 of the housing 34. The cross member 41 of each of the projections 40 is slidably received by a cooperating T-shaped vertically extending slot 42 which is formed in a vertically extending member 44 disposed on the side wall 24. Spring means (not shown) may be provided to urge the housing 34 downwardly.

As illustrated in Figure 5, where the corresponding parts are indicated by the subscript "a," the housing 34a may also be movably mounted relative to the side wall 24a by a plurality of spaced apart spring steel bars 46. Each of the bars 46 is suitably connected to the top wall 36a of the housing 34a and the frame 22a in such a manner that the housing 34a is urged downwardly. Of course, other methods of mounting the housing 34 may be utilized.

An endless belt 49, which is adapted to engage the conveyor belt 12, is carried within the housing 34 by a pair of transversely extending rollers 50 and 52 situated respectively at the ends of the endless belt 49. In the illustrated embodiment, each of the rollers 50 and 52 is rotatably mounted on a shaft 54 and 56, respectively, each of which is journaled in a separate pair of bearings 58 and 59 fixedly mounted respectively to the inner and outer walls 38 and 60 of the housing 34.

The endless belt 49 may be constructed of a bolt material such as rubber, neoprene, plastic, etc., which is able to withstand the use that a belt of this type is subjected to. The endless belt 49 is made of sufficient thickness to extend above the lower edge of the inner wall 38 of the housing 34 and preferably, comprises a plurality of sequential segments 64 attached at their inner ends to an endless strip 66 of material as shown in Figures 1, 2 and 4. When such an endless belt 49 turns back upon itself, each segment 64, because of the difference in the length of travel of the outer surface and inner surface of the belt 49, kicks out any material gathered on the outer surface thereof. However, a continuous non-segmented belt may be used without deviating from the scope of the invention.

Since the housing 34, and thus the endless belt 49 is vertically movable relative to the wall 16, the lower surface of a lower run 67 of the endless belt 49 frictionally engages the upper surface of the conveyor belt 12 and is driven by the conveyor belt 12, thereby eliminating the wear on the conveyor belt.

Ordinarily, the upper run 16 of the conveyor belt 12 sags to a certain extent between adjacent supporting rollers 18. To insure that the lower run 67 of the endless belt 49 engages the upper surface of the conveyor belt 12 without interruption, in the illustrated embodiment a plurality of transversely extending spaced apart rollers 68 are provided within the housing 34 to press downwardly on the upper surface of the lower run 67. The shaft 70 of each roller 68 is journaled in a pair of bearings 72 and 74, which are slidably mounted respectively in vertically extending slots 76 and 77 in the inner and outer side walls 38 and 60 of the housing 34. In order to insure that each roller 68 presses downwardly on the run 67, a spring 78 is disposed within a vertically extending tubular member 79 located in each slot 76 and 77 above the associated bearings 72 and 74, the spring 78 thereby pressing upon the upper surface of the associated bearings 72 and 74. Of course, the roller 68 may be individually adjusted and then mechanically locked in position by a suitable means (not shown) without deviating from the scope of the invention.

While under normal operation the endless belt 49 prevents the material from spilling out from underneath the wall 24, if the endless belt 49 breaks for some reason, it is desirable to have a supplementary means which automatically substitutes for the endless belt 49. In the illustrated embodiment, this is accomplished by attaching an elongated strip 80 of flexible material such as rubber, to the lower edge of the inner wall 38 of the housing 34, the strip 80 extending downwardly therefrom a distance such that the lower edge of the strip 80 does not touch the conveyor belt 12 when the endless belt 49 is in position. However, if the endless belt 49 breaks, it is thrown out from the housing 34, and since the housing 34 is then unsupported, the housing 34 will drop. Thus the strip 80 will engage the conveyor belt 12 and prevent material from escaping from beneath the wall 24.

Because the weight of the housing 34 is then supported by the strip 80, the strip 80 is liable to be flexed considerably, and hence, may cause excessive wear of the conveyor belt 12. Therefore, it is desirable to support a portion of the weight of the housing 34 by some other means. In the illustrated embodiment, a portion of the weight of the housing 34 is supported by a pair of wheels 81 and 82, which are journaled on shafts 84 and 86 respectively, extending outwardly from each end of the outer wall 60 of the housing 34. The shafts 84 and 86 are located at such a height that the lower surfaces of the wheels 81 and 82 are slightly above the lower edge of the strip 80 so that the strip 80 makes sufficient contact with the conveyor belt 12, when the endless belt 49 breaks, to fill in the valleys in the surface of the conveyor belt 12. In this way, while the main portion of the weight of the housing 34 is supported by the wheels 81 and 82 riding on the conveyor belt 12, the strip 80 is in sufficient contact with the conveyor belt 12 to prevent material from escaping from beneath the wall 24.

Certain materials which may be conveyed, tend to enter the housing 34 and be accumulated therein. To reduce this accumulation, the side walls 38 and 60 of the housing 34 may be provided with a plurality of apertures 90. Moreover, to reduce the effects of the material on the bearings 58, 59, 72 and 74, the bearings may be mounted to the outer wall 60 of housing 34 and not to the inner wall 38 which may then have a continuous surface.

The retaining means 32 associated with the other side wall 26 of the chute 20 is similarly constructed as the one described above. However, it should be realized that in some applications only one retaining device 32 may be utilized. Also, the retaining device 32 in combination with a properly supported wall or skirt board may be utilized along one side or both sides of a conveyor belt to prevent material from escaping off the associated edge of the conveyor belt. Moreover, in certain applications instead of troughing a conveyor belt, an endless belt may be located along the side edge of a portion of the conveyor belt to prevent material from spilling over the edge.

In operation, the endless belt 49 rides on the conveyor belt 12, the endless belt 49 being moved at the same speed as the conveyor belt 12 due to the frictional engagement therebetween. In this way, there will be very little wear on the conveyor belt 12. Furthermore, the segments 64 of the endless belt 49 separate as the belt 49 turns back upon itself thereby kicking out any grit which may gather between the endless belt 49 and the conveyor belt 12. If the endless belt 49 should break for any reason, since the housing 34 is then no longer supported by the endless belt 49, it will drop until the wheels 81 and 82 engage the upper surface of the conveyor belt 12. The strip 80 will then function to prevent the material from spilling out from under the walls of the chute 20.

Various changes and modifications may be made in the above described device without departing from the spirit or scope of the invention. Various of the features are set forth in the accompanying claims.

I claim:

1. In combination, a moving conveyor belt, a hopper supported above said conveyor belt, said hopper including means defining a pair of spaced apart walls disposed generally vertically relative to said conveyor belt and extending generally longitudinally along the conveyor belt, and an endless belt carried by each of said walls for vertical movement relative thereto and including a longitudinally extending lower run which is in frictional engagement with the conveyor belt adjacent the associated wall and a longitudinally extending upper run disposed above said lower run, said endless belt being moved by said conveyor belt and having a sufficient vertical thickness so that the upper edge of the lower run extends above the lower edge of said associated wall to thereby prevent material being conveyed from spilling out from beneath said wall.

2. In combination, a conveyor belt, a hopper supported above said conveyor belt, said hopper including a pair of spaced apart walls disposed generally vertically relative to said conveyor belt and extending generally longitudinally along the conveyor belt, means on the outside of each wall defining a secondary wall which is vertically movable relative thereto, and an endless belt carried by each of said secondary walls on the outside thereof and including a run which is in frictional engagement with the conveyor belt adjacent the associated secondary wall, said endless belt being movable with said conveyor belt and having a thickness such that the upper edge of said run extends above the lower edge of said associated secondary wall, thereby preventing material being conveyed from spilling out from beneath the associated wall.

3. In combination a moving conveyor belt and retaining means for preventing material being conveyed from spilling over the sides of the conveyor belt, said retaining means comprising a frame, means on said frame defining at least one wall disposed generally vertically relative to said conveyor belt, said wall extending generally longitudinally along and being spaced above the conveyor belt, means on the outside of said wall defining a secondary wall which is vertically movable relative thereto, and an endless belt carried by said secondary wall on the outside thereof and including a run which is in frictional engagement with the conveyor belt adjacent said secondary wall, said endless belt being movable with the conveyor belt and having a thickness such that the upper edge of said run extends above the lower edge of said secondary wall, thereby preventing the material from spilling out from beneath said wall.

4. In combination a moving conveyor belt, and at least one retaining means for preventing material being conveyed from spilling over the sides of the conveyor belt, said retaining means comprising a frame, means on said frame defining a wall disposed generally vertically relative to said conveyor belt and extending generally longitudinally along the conveyor belt, means on the outside of said wall defining a secondary wall which is vertically movable relative thereto, an endless belt carried by said secondary wall on the outside thereof and including a lower run which is in frictional engagement with the conveyor belt adjacent said secondary wall, said endless belt being movable with said conveyor belt and having sufficient thickness to extend above the lower edge of said secondary wall, a plurality of transversely extending rollers disposed between the ends of said endless belt and carried by said secondary wall for vertical movement relative thereto, and means urging said rollers downwardly into contact with said lower run, thereby pressing said lower run into engagement with the conveyor belt.

5. In combination a moving conveyor belt and at least one retaining means for preventing material being conveyed from spilling over the sides of the conveyor belt, said retaining means comprising a frame, means on said frame defining a wall disposed generally vertically relative to said conveyor belt and extending generally longitudinally along the conveyor belt, means on the outside of said wall defining a secondary wall which is vertically movable relative thereto, a longitudinally extending strip of flexible material connected to and extending below said secondary wall, said strip being spaced above the conveyor belt, an endless belt carried by said secondary wall on the outside thereof and including a lower run which is in frictional engagement with the conveyor belt adjacent said secondary wall, said endless belt having sufficient thickness to extend above the lower edge of the said strip, a wheel rotatably mounted by said means defining said secondary wall adjacent each end thereof and spaced above the conveyor belt a distance such that the lower surface thereof is slightly above the lower edge of said strip, whereby if the endless belt breaks said wheels will support the major portion of the weight of said secondary wall.

6. In combination, a moving conveyor belt, a hopper supported above said conveyor belt, said hopper including a pair of spaced apart, generally vertically disposed walls extending generally longitudinally along said conveyor belt, a housing mounted to the outside of each of said walls for vertical movement relative thereto, said housing including an inner wall, an upper wall, and an outer wall, a longitudinally extending strip of flexible material connected to and extending below said inner wall, said strip being spaced above the conveyor belt, a longitudinally extending endless belt carried by said housing between said inner and said outer walls and including a lower run which frictionally engages the surface of the conveyor belt, said endless belt having sufficient thickness to extend above the lower edge of said strip, a plurality of transversely extending rollers disposed between the ends of said endless belt and rotatably mounted to the housing for vertical movement relative thereto, spring means on said housing urging said rollers downwardly into contact with said lower run, thereby pressing said lower run into engagement with the conveyor belt, a wheel rotatably mounted to the outside of said outer wall adjacent each end thereof and spaced above the conveyor belt a distance such that the lower surface thereof is slightly above the lower edge of said strip, whereby if the endless belt breaks said wheels will support the major portion of the weight of said housing.

7. A conveyor means comprising in combination a moving conveyor belt and retaining means for preventing material being conveyed from spilling over the side of said conveyor belt, said retaining means including a frame, means on said frame defining at least one wall disposed generally vertically relative to said conveyor belt, said wall extending generally longitudinally along, and being spaced above said conveyor belt, and an endless belt disposed on said wall and including a longitudinally extending lower run which is in frictional engagement with said conveyor belt adjacent said wall and a longitudinally extending upper run disposed above said lower run, said endless belt being moved by said conveyor belt and having a vertical thickness such that the upper edge of said lower run extends above the lower edge of said wall, thereby preventing the material from spilling out from beneath said wall.

References Cited in the file of this patent

UNITED STATES PATENTS

| 721,496 | Bartlett | Feb. 24, 1903 |
| 1,638,401 | Kuhrt | Aug. 9, 1927 |
| 2,679,924 | Powell | June 1, 1954 |
| 2,847,112 | Black et al. | Aug. 12, 1954 |

FOREIGN PATENTS

| 52,020 | Germany | May 8, 1890 |